(12) United States Patent
Willis et al.

(10) Patent No.: US 12,312,266 B1
(45) Date of Patent: May 27, 2025

(54) SYSTEM AND METHOD FOR WASTEWATER TREATMENT

(71) Applicant: Brown and Caldwell, Walnut Creek, CA (US)

(72) Inventors: John L. Willis, Peachtree Corners, GA (US); Christopher D. Muller, Londonderry, NH (US); Ahmed Al-Omari, Aldie, VA (US); Jose Jimenez, Winter Springs, FL (US); Pusker Regmi, Rockville, MD (US); Dante Fiorino, Columbus, OH (US)

(73) Assignee: BROWN AND CALDWELL, Walnut Creek, CA (US)

(*) Notice: Subject to any disclaimer, the term of this patent is extended or adjusted under 35 U.S.C. 154(b) by 434 days.

(21) Appl. No.: 17/858,301

(22) Filed: Jul. 6, 2022

Related U.S. Application Data

(60) Provisional application No. 63/218,580, filed on Jul. 6, 2021.

(51) Int. Cl.
*C02F 3/34* (2023.01)
*C02F 1/52* (2023.01)
(Continued)

(52) U.S. Cl.
CPC ............ *C02F 3/341* (2013.01); *C02F 1/5245* (2013.01); *C02F 3/286* (2013.01); *C02F 11/14* (2013.01); *C02F 2101/34* (2013.01); *C02F 2103/005* (2013.01); *C02F 2103/20* (2013.01); *C02F 2209/02* (2013.01)

(58) Field of Classification Search
None
See application file for complete search history.

(56) References Cited

U.S. PATENT DOCUMENTS

| | | | |
|---|---|---|---|
| 4,696,746 | A | 9/1987 | Ghosh et al. |
| 5,500,123 | A | 3/1996 | Srivastava |
| (Continued) | | | |

FOREIGN PATENT DOCUMENTS

| | | |
|---|---|---|
| CN | 113023845 | 6/2021 |
| WO | 2016090490 | 6/2016 |
| (Continued) | | |

*Primary Examiner* — Krishnan S Menon
(74) *Attorney, Agent, or Firm* — AdamsIP, LLC; Kenneth Bush

(57) ABSTRACT

A method for treating a wastewater comprising phosphates and other nutrients and organic solids comprises feeding the wastewater into an acid gas digester where digestible carbohydrates in the wastewater undergo acidogenesis and acetogenesis forming volatile fatty acids and a suspended solids content to produce an organic acid digest. The acid gas digester effluent is fed into a plurality of harvesting anaerobic digesters connected in series downstream from the acid gas digester. A portion of the solubilized phosphates are precipitated from the wastewater in a first harvesting digester to produce a harvesting digester effluent from the first harvesting digester in the series having a reduced solubilized phosphate content. The harvesting digester effluent is fed into an anaerobic methane digester downstream of the last harvesting digester in the series. Organic solids in the harvesting digester effluent are converted into methane and a digested anaerobic sludge.

20 Claims, 2 Drawing Sheets

(51) Int. Cl.
  *C02F 3/28* (2023.01)
  *C02F 11/14* (2019.01)
  *C02F 101/34* (2006.01)
  *C02F 103/00* (2006.01)
  *C02F 103/20* (2006.01)

(56) References Cited

U.S. PATENT DOCUMENTS

| | | | |
|---|---|---|---|
| 6,338,799 | B1 | 1/2002 | Fukushima et al. |
| 6,921,485 | B2 | 7/2005 | Kilian et al. |
| 7,842,186 | B2 | 11/2010 | Chung et al. |
| 8,263,034 | B2 | 9/2012 | Chung |
| 8,496,827 | B2 | 7/2013 | Baur |
| 8,568,590 | B2 | 10/2013 | Barak |
| 8,613,894 | B2 | 12/2013 | Zhao et al. |
| 8,747,672 | B2 | 6/2014 | Bowers |
| 8,765,449 | B2 | 7/2014 | Stewart |
| 8,894,854 | B2 | 11/2014 | Loetscher et al. |
| 9,133,068 | B2 | 9/2015 | Callendrello et al. |
| 9,359,239 | B2 | 6/2016 | Liu et al. |
| 9,926,213 | B2 | 3/2018 | Vanotti et al. |
| 10,017,795 | B2 | 7/2018 | Chandran |
| 10,189,711 | B2 | 1/2019 | Bowers |
| 10,196,289 | B2 | 2/2019 | Cote et al. |
| 10,266,440 | B2 | 4/2019 | Assadi et al. |
| 10,604,433 | B2 | 3/2020 | Maher et al. |
| 10,934,194 | B2 | 3/2021 | Tabanpour |
| 2008/0053913 | A1 | 3/2008 | Fassbender |
| 2012/0034681 | A1* | 2/2012 | Loetscher ............. C12M 23/44 |
| | | | 435/267 |
| 2012/0261338 | A1 | 10/2012 | Kuzma et al. |
| 2012/0318745 | A1 | 12/2012 | Bowers |
| 2013/0299420 | A1* | 11/2013 | Barak ................... C02F 1/5245 |
| | | | 210/603 |
| 2014/0231359 | A1 | 8/2014 | Cote et al. |
| 2016/0185633 | A1 | 6/2016 | Pullammanappallil et al. |
| 2021/0205731 | A1 | 7/2021 | Prasad et al. |
| 2021/0354072 | A1 | 11/2021 | Rhu et al. |

FOREIGN PATENT DOCUMENTS

| | | | |
|---|---|---|---|
| WO | WO-2020058422 A1 * | 3/2020 | ............. C02F 11/04 |
| WO | 2021072551 | 4/2021 | |
| WO | 2021260042 | 12/2021 | |

* cited by examiner

SYSTEM AND METHOD FOR WASTEWATER TREATMENT

CROSS-REFERENCE TO RELATED APPLICATIONS

The present application claims priority to and benefit of U.S. Provisional Application No. 63/218,580, entitled "Acid+Digestion Process" and filed on Jul. 6, 2021, the content of which is hereby incorporated by reference herein in its entirety

FIELD OF THE INVENTION

Processing and treatment of solid and liquid wastes in wastewater is described and, more particularly, an anaerobic digestion system and method used in wastewater treatment for solids stabilization and enhancing biogas production.

BACKGROUND OF THE INVENTION

Wastewater treatment utilities are being increasingly asked to balance highly sustainable operations while keeping impacts to rate payers to a minimum. Solids stabilization is one area that utilities have used increasingly to achieve that balance, through enhanced energy production from advanced (i.e., intensified) anaerobic digestion processes and co-digestion of supplemental feedstock (e.g., FOG, food waste, etc.). Anaerobic digestion technology reduces organic waste while also recovering biogas containing methane and carbon dioxide as by-products. The utilization of anaerobic biological treatment of organics is increasing in practice within the wastewater sector as a means of waste treatment, including stabilization and resource recovery. A number of process configurations currently exist that provide either objective as part of its core design, but opportunities to achieve additional benefits and improved effectiveness in a fully integrated solution exist.

Multi-phase anaerobic processes have been introduced that consist of an acid gas digester followed by a methane digester. The purpose of such an arrangement is to separate and optimize environmental conditions for the several microbial processes involved in anaerobic digestion and thereby enhance methane production to produce biosolids with reduced pathogen content. The acid gas digester produces low molecular weight organic acids from digestible carbohydrates, proteins and lipids at mesophilic temperatures by processes of acidogenesis and acetogenesis, with shorter retention times of 1 to 3 days. The acid gas digester effluent then passes to the anaerobic methane digester where the microbial process of methanogenesis produces methane in the form of biogas from the products of the acid phase.

Acid gas anaerobic digestion was developed to create separate environments idealized for hydrolysis and acidogenesis and methane formation, with distinct microbial populations in separate reactors performing better than in a conventional mixed culture. While the underlying fundamentals of acid gas digestion are strong, implementation has been limited to only 10 to 20 facilities in North America due to full-scale performance not matching promised improvements. While research continues to support the further development and optimization of acid phase digestion, it does not fundamentally address the needs of utilities for separate resource recovery, increased digestion capacity, materials recovery, and solids management. Moreover, no known processes fully integrate separate resource recovery and solids stabilization, rather requiring ancillary systems to achieve both of these goals.

Wastewater solids have components of significant value beyond energy, specifically nutrients such as phosphorous, which are now being recovered. Wastewater treatment plants are obliged to reduce phosphorus levels in discharge water to low levels, but typically do so by directing the phosphorus to the biosolids, which are usually land applied. In doing so, sewage treatment plants are often faced with nuisance formation of phosphate minerals, principally struvite, in pipes, heat exchangers, and tanks due to the high levels of phosphate produced during anaerobic digestion of the solids.

Beneficial reuse of biosolids as a soil amendment is commonly limited by agronomic loading of nitrogen (N) to approximately match the nitrogen uptake of the crops grown. But more frequently, biosolids reuse is also restricted by agronomic loading of phosphorus (P), which can in turn reduce the allowable loading by half or more. As such, diversion of phosphorus from biosolids to an alternative product would represent further optimization.

Commercial nutrient recovery processes recover the nitrogen and phosphorus as struvite and brushite, principally from pre-digestion thickening and post-digestion dewatering recycle streams. Nutrient recovery protects downstream dewatering and centrate return piping from struvite scale that often requires cleaning or complete pipe replacement. In the presence of dissolved phosphorus, ammonia ($NH_3$), and magnesium (Mg), slight, highly localized pH increases catalyze struvite formation. In anaerobic digesters, these localized pH increases occur when turbulence removes carbon dioxide ($CO_2$) from solution. Turbulence created by pumps, draft-tubes, or centrifuges, or occurring at piping elbows, valves, or in the tortuous pathways in heat exchangers, forms struvite as hard scale on surfaces. Such buildup robs capacity and eventually demands maintenance or replacement due to clogging.

For the foregoing reasons, there is a need for an integrated process that intensifies digestion in terms of capacity and energy production, while providing nutrient recovery for phosphorus and nitrogen in the same process to access their value and reducing ongoing digestion process maintenance.

SUMMARY OF THE INVENTION

A method is provided for treating a wastewater comprising phosphates and other nutrients and organic solids. The wastewater treatment method comprises the steps of feeding the wastewater into an organic acid digester where digestible carbohydrates in the wastewater undergo acidogenesis and acetogenesis forming volatile fatty acids (VFAs) and a suspended solids content to produce an organic acid digester effluent. The organic acid digester effluent is then fed into a plurality of harvesting anaerobic digesters downstream from the organic acid digester, each of the plurality of harvesting digesters connected in series. Effluent from each of the plurality of harvesting digesters is fed to a subsequent one of the plurality of harvesting digesters in the connected series of harvesting digesters. A portion of the solubilized phosphates are precipitated from the wastewater in a first harvesting digester to produce a harvesting digester effluent from the first harvesting digester in the series having a reduced solubilized phosphate content. The harvesting digester effluent is fed into an anaerobic methane digester downstream of the last harvesting digester in the series, wherein organic solids in the harvesting digester digest are converted into methane and a digested anaerobic sludge. The anaerobic methane digester may comprise a plurality of anaerobic methane digesters in series and is responsible for producing methanogenic biology at rates more than their discharge from the system, thereby providing a stable population for inoculation of the harvesting digesters.

In one aspect, the wastewater includes one or more of sewage sludge, fecal sludge, agricultural waste, animal processing waste, municipal solid organic waste, food waste, fats, oils, greases, and industrial waste.

In another aspect, the wastewater treatment method may further comprise the step of feeding the first harvesting digester with a recycle stream comprising a portion of the anaerobic methane digester effluent having a concentration of a methanogenic bacteria.

In a further aspect, the wastewater treatment method may further comprise the step of recirculating biogas into the plurality of harvesting digesters or using other mechanical means to degas dissolved $CO_2$ and raise the pH.

In another embodiment, a base, such as a crystal-forming cation like magnesium (Mg) or calcium (Ca), may be added to the first harvesting digester in series to adjust pH, and precipitate soluble nitrogen species and phosphorus species (ortho-phosphate) in the form of struvite or brushite. The base can be selected from magnesium hydroxide, magnesium chloride, calcium hydroxide, calcium oxides, calcium chlorides, combinations thereof, or other bases. The pH in each of said plurality of anaerobic digesters is thus maintained at about 7.0.

The wastewater treatment method may further comprise the step of recuperative thickening of an effluent from an anaerobic harvesting digester or a methane digester, and returning thickened solids to the same harvesting digester or the same methane digester. Similarly, a water remover may be provided for receiving an effluent from the anaerobic methane digester, and dewatering the digested anaerobic sludge to produce a thickened sludge. The water so removed would have higher concentrations of VFAs as recuperative thickening feed is supplied from earlier process stages, such as the acid gas digester and the first or second harvesting digesters, respectively, in order of decreasing removed water VFA concentrations.

In a thermophilic operation, the method comprises the step of maintaining a temperature in the acid gas digester at about 50° C. to about 70° C. Alternatively, the temperature in the acid gas digester, the harvesting digesters and the anaerobic methane digesters may be maintained at about 50° C. to about 70° C.

In another aspect, a solids retention time (SRT) in the acid gas digester is maintained at about 1 day to about 1.5 days. An SRT in the harvesting digesters is maintained at about 0.5 days to about 1.2 days. In many cases, the acid gas digester and the harvesting digesters would have similar volumes. An SRT in the anaerobic methane digesters is maintained at about 15 days or more.

BRIEF DESCRIPTION OF THE DRAWINGS

For a more complete understanding of the apparatus and method for wastewater treatment, reference should now be made to the embodiments shown in the accompanying drawings and described below. In the drawings.

DETAILED DESCRIPTION OF THE INVENTION

Figure 1:
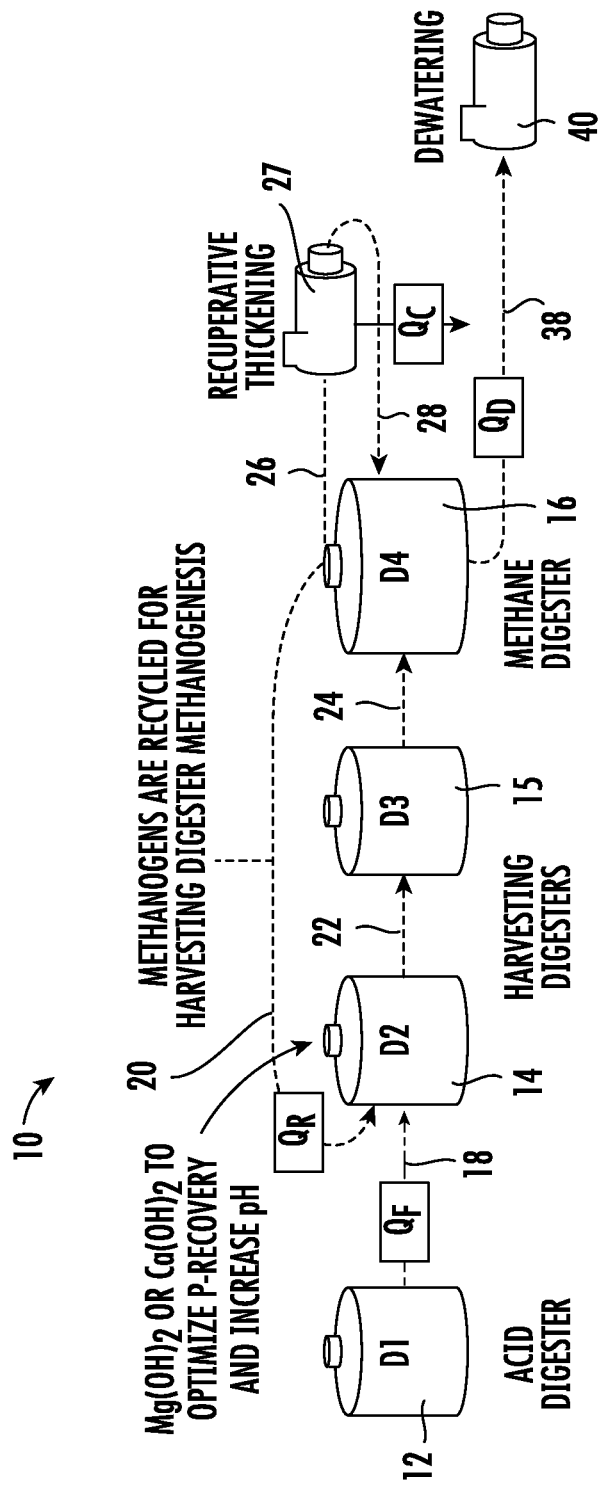
FIG. 1 is a schematic view of an embodiment of a process for treating solid and liquid wastes in wastewater using an anaerobic digestion system and method.

As used herein, the term "anaerobic treatment" is understood as anaerobic digestion, or fermentation, which may be considered as a partial anaerobic digestion. In one embodiment, the anaerobic treatment step is carried out in a series of anaerobic tanks. This treatment step can be carried out in different ways: in a single reactor or in several reactors in parallel or in series, at various temperatures, mesophilic (32-42° C.), thermophilic (50-62° C.) or a mixture of both.

As used herein, the term "fermentation" is a process well-known in the art and may be defined as a biological anaerobic process extracting energy from carbohydrates in the absence of oxygen, to produce small molecules (organic substrates), in particular readily biodegradable carbons (RBCs), through the action of enzymes in particular. No methane is produced, or only trace amounts. The fermentation process may be controlled by the retention time of the sludge in the anaerobic tank, temperature and pH in the anaerobic tank, as well as by the specific microbial population involved in the fermentation process (i.e., by the choice of microbial strains in the anaerobic tank).

As used herein, the term "anaerobic digestion" is a process involving microorganisms that break down biodegradable material in the absence of oxygen. This process produces a digestate and a gaseous fraction comprising methane, and typically consisting essentially of methane and $CO_2$, also called biogas. Advantageously, the anaerobic digestion is a digestion of effluents. The anaerobic treatment is usually performed at pH conditions between 6.5 and 8.5, preferably between 7.0 and 7.5.

As used herein, the term "digestate" is the non-gaseous product of an anaerobic digestion, while the term "fermentate" is the fermentation product. However, in the present description, unless stated otherwise, the word "digestate" will encompass the non-gaseous product of the anaerobic treatment or phase of anaerobic treatment, that is, respectively a "conventional" digestate for a digestion, and a "fermentate" for a fermentation. A digestate, and more specifically a fermentate comprises readily biodegradable carbons, and more particularly volatile fatty acids (VFAs) or other fermentation products.

As used herein, the term "struvite" (ammonium magnesium phosphate) is a phosphate mineral with formula (($NH_4$)$MgPO_4 \cdot 6H_2O$). Struvite crystallizes in the orthorhombic system as white to yellowish or brownish-white pyramidal crystals or in platey mica-like forms. It is a soft mineral with Mohs (the Mohs scale of mineral hardness) of 1.5 to 2 and has a low specific gravity of 1.7. It is sparingly soluble in neutral and alkaline conditions, but readily soluble in acid. In the presence of dissolved Ca, "brushite" may be formed coincidentally with or instead of struvite. Brushite and other similar crystals may be included or produced when the term struvite is used herein.

As used herein, the term "VFAs" or "volatile fatty acids" are also known in the art. In particular, they include lower carboxylic acids, notably $C_1$-$C_4$ saturated, linear or ramified hydrocarbon chains substituted by a COOH group, such as acetic acid, butyric acid, propionic acid, advantageously acetic acid.

As used herein, the terms "methane digesters" or "methane digestion" means digesters and process phases where both hydrolysis and methanogenesis functions happen in a single process stage, much like conventional digestion.

As used herein, each stage of the process including acid gas digestion, harvesting digestion, or methane digestion, where shown as a single process unit or tank, may represent two or more actual tanks operated in either series or parallel feed and operation.

A system and method as described herein provides a process in which biogas optimization and capacity enhancement and solids stabilization are combined in an integrated plurality of anaerobic digesters in series. The process is based on a combination of biological and chemical processes, including acid fermentation of organics, acetoclastic and hydrogenotrophic methanogenic anaerobic digestion, recuperative thickening, and precipitation and recovery of nutrients. Soluble nitrogen species (ammonia) and phosphorus species (ortho-phosphate) are recovered in the form of struvite, brushite, or vivianite through the addition of magnesium hydroxide, magnesium chloride, calcium oxides or chlorides or iron addition, respectively. The process causes struvite formation in a pretreatment step that protects both methane-phase anaerobic digesters and downstream dewatering, and removes the associated struvite nutrients from the final biosolids. It is understood that the implementation of the process in an installation would be site specific, largely dependent on existing infrastructure and liquid treatment and solids handling process demands and utility objectives. The present description addresses the flexibilities within the basic process context.

The process is adaptable for optimizing and enhancing the production of methane and volatile fatty acids from virtually any organic waste, including, but not limited to, wastewater generated in a municipal sewage treatment facility. Other types of organic waste can be utilized, including sewage sludge, fecal sludge, agricultural waste, animal processing waste, municipal solid organic waste, food waste, and industrial waste, such as brewery waste, pharmaceutical waste, biodiesel waste and chemical waste.

An embodiment of the process is shown schematically in FIG. 1 and generally designated at 10. The process 10 comprises a system of three anaerobic digesters 12, 14, 15 and one or more larger downstream anaerobic methane digesters operating in series or in parallel, which is shown in FIG. 1 as a single anaerobic methane digester 16. The system comprises a three-step method for anaerobic digestion that includes an acid gas digester (D1) 12; one, two, or more harvesting digesters (D2, D3) 14, 15 and the methane digester (D4) 16. Phosphorus is precipitated and removed from the first harvesting digester 14 after it has been solubilized during the process of acetogenesis in the acid gas digester 12 and the first harvesting digester 14, and before it can be precipitated in the solid phase in the second harvesting digester 15, in the methane digester 16, or further downstream.

The feed wastewater enters the first stage acid gas digester 12. Digestible carbohydrates, proteins, and lipids in the feed undergo acidogenesis and acetogenesis to produce an acid gas digester effluent 18 containing solubilized phosphates, soluble magnesium and calcium, and a relatively high concentration of volatile and non-volatile fatty acids. Depending on the nature of the starting feed, the solubilized and precipitated phosphates can include magnesium phosphates, calcium magnesium phosphates, or calcium phosphates. The fatty acids will generally include acetic acid and propionic acid, but can also include other fatty acids, such as n-butyric acid, n-valeric acid, iso-butyric acid, iso-valeric acid, sec-valeric acid, and combinations thereof. Other components of the starting sludge, the acid gas digester effluent 18, or both, may include solubilized and precipitated nitrogen compounds, such as ammonium, sulfides, heavy metals, or metal salts. In one embodiment, the organic acid digester 12 expected pH is 4.6 to 5.5 and retention times are about 1 to about 2 days. The acid gas digester 12 has a low hydraulic retention time (HRT)/solids retention time (SRT) for hydrolysis of the feed. Biogas may be wasted for $H_2S$ diversion or combined with methane-phase biogas for combined use or wasting. The acid-phase digestion solubilizes phosphorous, magnesium (Mg), calcium (Ca) or other cations, while converting volatile solids (VS) to VFAs. The acid gas digester 12 also provides 75-85% of the entire process heating at low pH, which minimizes formation of scale. Accordingly, there is dramatically less heat exchanger struvite fouling and less maintenance is required.

The harvesting digesters 14, 15 are operated in series. The first harvesting digester 14 receives the acid gas digester effluent 18 as pretreated feedstock ($Q_F$) from the acid gas digester 12 and recycle feed 20 of digested biomass ($Q_R$) from the larger, downstream methane digester 16 and the methane phase digestion process. The methanogens in the recycled digested biomass digest some of the VFAs, produce digester gas, and increase the pH through alkalinity production. The harvesting digesters 14, 15 are sized to match the acid gas digester 12 for redundancy. At least one harvesting digester 14, 15 is required in order to maintain the process when another harvesting digester is out of service for maintenance or other reasons. Each of the harvesting digesters 14, 15 has an SRT of about 0.5 to about 1.5 days, as a function of the recycle feed 20 volume from the methane digester 16 ($Q_R$). It is understood that although two harvesting digesters 14, 15 are shown, there may be only one or three or more harvesting digesters.

The first harvesting digester 14 also receives either magnesium hydroxide ($Mg(OH)_2$), lime ($Ca(OH)_2$) or some other pH-increasing and cation-delivering base. The base chemicals increase the pH to over 6.5 so that methanogenesis can occur, while adding Mg or Ca for stoichiometric production of struvite (magnesium ammonium phosphate) or brushite ($CaHPO_4 \cdot 2H_2O$). While any P-based crystals can be produced, the term "struvite" is used herein to denote this entire class of recoverable, fertilizer crystals. Soluble phosphate in the acid gas digester 12 is prone to controlled precipitation when pH values are brought to near neutral values, especially when dissolved calcium or magnesium and ammonium are present. Because biological methane production also produces alkalinity, demand for $Mg(OH)_2$ or other base is lower while maintaining the first harvesting digester 14 at a pH of about 7.1. Struvite formation is biased to the harvesting digesters 14, 15. Modeling suggests that 46%, 17%, and 37% of the struvite will be formed in the two harvesting digester 14, 15 and the methane digester 16 process phases, respectively.

The contents of the harvesting digesters are mixed with a plurality of unconfined gas lances (not shown) supplied with recirculated biogas. The gas mixing provides for vigorous, continuous mixing to encourage struvite formation and removal as grit. The unconfined gas lances also enhance removal of dissolved $CO_2$ by stripping and cause localized pH increases to a value near neutral within the digesting bulk phase as rising bubbles remove $CO_2$. This effect causes struvite to form as discrete, detached "grit" particles that settle on the digester floor, but can be readily removed.

In one embodiment, the digesters 12, 14, 15, 16 are equipped with flat floors, large hatches, and cross-ventilation provisions so that material would be rinsed to a drain or safely recovered with a front end loader. Other means to remove precipitated struvite without draining or removing digesters from service are also possible.

In one embodiment, a new acid gas digester 12 and harvesting digesters 14, 15 could be built as a group of four tanks using common wall construction upstream of existing methane digesters 16. Such an arrangement could be provided with gravity sludge transfer as digesting solids move sequentially through online tanks, eliminating the potential for equipment fouling or wear from struvite production and conveyance. Moreover, there is no heating or recirculation piping for fouling.

It is understood that only one harvesting digester 14 is needed for a full-scale installation. However, two or more harvesting digesters 14, 15 run in series or parallel are preferred.

Additional reactors in series increase recovery of struvite through each tank. This configuration also allows the process 10 to be maintained when one harvesting digester is out of service for struvite collection or other maintenance. The first remaining harvesting digester serves as D2 during the "outage". A single harvesting digester 14, 15 tank (D2 or D3) maintains almost ¾ (47% of the total of 46%+17%=73%≈nominally ¾) of the struvite "protection" of having both tanks in service. Total biogas production should remain virtually unchanged with a corresponding increase in the methane digester.

The processed harvesting digester effluent 24 is sent to the methane digester 16 for methanogenesis. The methane digester 16 receives organic waste in the harvesting digester effluent 24 from the last in series harvesting digester 15 and performs the anaerobic digestion. The anaerobic digester decomposes organic waste into digestate and biogas using anaerobic microorganisms under an anaerobic conditions in which free oxygen does not exist. The biogas contains methane ($CH_4$), carbon dioxide ($CO_2$), and trace amounts of other substances, such as hydrogen sulfide. The methane digester 16 has a SRT of nominally 10 to at least 15 or more days at average flow rates to maintain methanogenesis biology. Adequate capacity is required to provide a system SRT where methanogen growth exceeds the rate wasted from the system, the sum wasted in the methane digester sludge ($Q_D$) 38 or low solids stream ($Q_C$) from a thickener 27. This SRT requirement is analogous to the textbook 15-day requirement for mesophilic anaerobic digesters. Limited heating is required only to offset shell losses. In a retrofit, the large methane digesters could be all, or most, of a wastewater resource recovery facility's existing digestion process or built new at an appropriate size.

FIG. 1 also shows thickening of the contents or discharges from the methane digester 16 (D4) in the methane phase. The centrate digestate 26 generated by the anaerobic digestion in the methane digester 16 is delivered to a thickening apparatus 27 for recuperative thickening. Recuperative thickening may be provided using the thickening apparatus 27, which may be one or more gravity belts, rotary drum, dissolved air floatation, gravity, or other thickening apparatus to maximize biogas. Recuperative thickening provides direct control of the solids inventory within the entire digestion process optimizing for capacity, performance, and stability. The overall capacity of the entire process 10 is enhanced by recuperative thickening to remove water that has been largely "freed up" by hydrolysis and methanogenesis in the digesters. The recuperative thickening step decouples HRT and SRT after most hydrolysis/VSR has occurred. A thickened solids feed 28 is returned to the methane digester 16 (D4), added to the recycle stream 20 to the first harvesting digester 14, or sent as finished biosolids for dewatering ($Q_C$) 40. The thickening location after the methane digester 16 maximizes use of VFAs for biogas production, with model-predicted return VFAs of only 80 mg/L. Thickening performed in a recuperative mode on the methane phase from the methane digester 16 also allows conversion of most VFAs to digester gas.

Recuperative thickening can be applied to the acid gas digester 12 or to either of the harvesting digester 14, 15 effluents 18, 22, 24 in a similar manner, wherein the all or a portion of the effluent stream 18, 22, 24 feed a thickening apparatus which returns a thickened solids feed to the same digester from which the effluent originated. Recuperative thickening can also be applied to the transfer steams 18, 22, 24 themselves. In this embodiment, feed for a thickening apparatus 27 is drawn from a transfer stream and a thickened solids stream is returned from the thickening apparatus to the same transfer stream.

Recuperative thickening provides for progressively higher return of VFAs to the liquid stream, but with less biogas. Intermediate thickening modes could be advantageous at specific wastewater treatment facilities with unmet activated-sludge carbon demands as filtrate with between 8,000 and 20,000 mg-VFA/L could be used for denitrification or biological phosphorous (Bio-P). In site-specific and adjustable operating modes, recycle quality from intermediate thickening could be adjusted based solely on the source of the sludge to be recuperatively thickened. Sludges from the harvesting digesters (D2, D3) 14, 15 and methane digester (D4) 16 phases having progressively lower VFA concentrations, and combinations of which could provide infinitely-variable recycled-VFA supply to meet process needs. Wastewater treatment facilities with mainstream Bio-P or denitrification processes at times require more carbon, normally provided by the purchase of supplemental carbon such as methanol or acetate. Thickening can be located upstream of the methane phase digester 16, for example at a harvesting digester 14, 15 to return higher concentration VFAs to the treatment process. Modeling shows that recycled sidestream VFA concentrations could be increased to 9,600 mg/L after the second harvesting digester (D3) 15, 11,800 mg/L after the first harvesting digester (D2) 14, or even 18,500 mg/L after the acid gas digester 12 (D1). This may be a more sustainable and cost effective use of the carbon generated in this process 10.

The process 10 is the first to provide a fully integrated process which provides similar process intensification benefits as a thermal hydrolysis process (THP), while also providing an integrated nutrient management and recovery strategy. Moreover, the process 10 was developed through the unique application of physical and chemical processes common to the wastewater industry. Thus, the process 10 merely requires the use of proven and familiar technologies, including complete-mix anaerobic digestion, added pumps for recycle and recuperative thickening and chemical metering systems. The process 10 described herein is therefore accessible to a broad spectrum of the wastewater industry, requiring only broadly available skillsets. The process 10 allows for local, market-driven nutrient recovery either integrated into the biosolids, as separate products, or even as farm- or site-specific blends. This means nutrients can be directed to the highest and best uses. There is also potential for directing carbon to its highest and best use with flexibility to either recycle volatile fatty acids as biogenic carbon sources for biological phosphorous (Bio-P) removal or denitrification. Produced VFAs can also be used for biogas/renewable energy production. This process also supports the evolution of wastewater resource recovery facilities (WRRFs) to product-driven biorefineries.

Application of the process has many advantages, including recovery of nitrogen and phosphorus nutrients in the form of a targeted precipitate (e.g., brushite, struvite), enhancement of anaerobic biological treatment capacity by 30 to 150 percent relative to current acid-gas or conventional anaerobic systems, reduction or elimination of equipment fouling and damage from phosphorus-based precipitates normally occurring in anaerobic treatment processes, production and recovery of biological intermediate products (e.g., volatile acids) through the arrest of the anaerobic digestion process for the purposes of recovery and beneficial use, reduction of biosolids phosphorus concentrations, and the production of biosolids/residual organics that can conform to the current United States Environmental Protection Agency (USEPA) regulations regarding Class A and Class B biosolids as outlined in CFR 40 Part 503.

Further benefits of the process 10 include cost-effective nutrient recovery through production of high-phosphorous struvite or brushite products with reduced struvite fouling on downstream piping and equipment. Most other struvite recovery systems target nutrient collection on thickening or dewatering side streams, preventing nutrient recycles that either require retreatment or that may be discharged in the wastewater treatment facility effluent. These systems do not protect the digesters and supporting equipment, which can require extensive, ongoing maintenance or lead to shorter equipment or piping useful lives. Biosolids phosphorous content is lowered by 40-60%, which allows for increased per-acre land application rates with greater carbon and more-balanced N benefits for sites with agronomic P limits. Biosolids dewaterability is improved by alleviating cation imbalances, requiring less polymer and energy.

Downstream digestion capacity is increased by up to 160%, with only a 20-25% increase in digester volume. This is comparable to capacity increases with commercially available THP systems, without complex mechanical and thermal requirements. Chemical demand is reduced over other struvite-recovery processes. $H_2S$ largely evolves in the acid phase biogas which can be directly wasted. That would reduce required digester gas $H_2S$ treatment, often by iron sponge, activated carbon, or other finite-life media. The potential to divert the acid phase $H_2S$ to waste could double the life between media replacements or reduce maintenance on gas use systems like boilers which typically have limited gas treatment.

Figure 2:
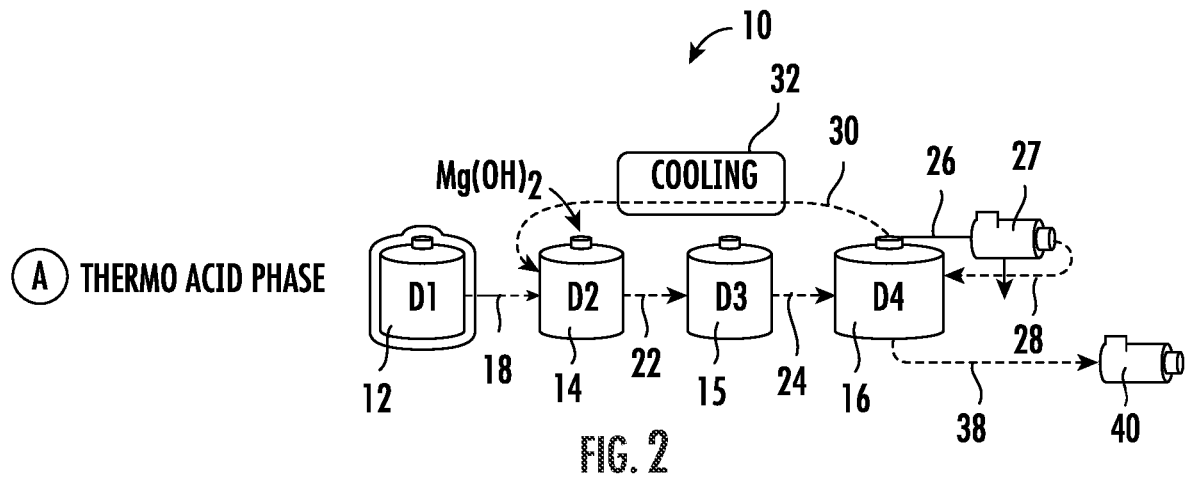
FIG. 2 is a schematic view of a second embodiment of a process for treating solid and liquid wastes in wastewater using an anaerobic digestion system and method.
Figure 3:
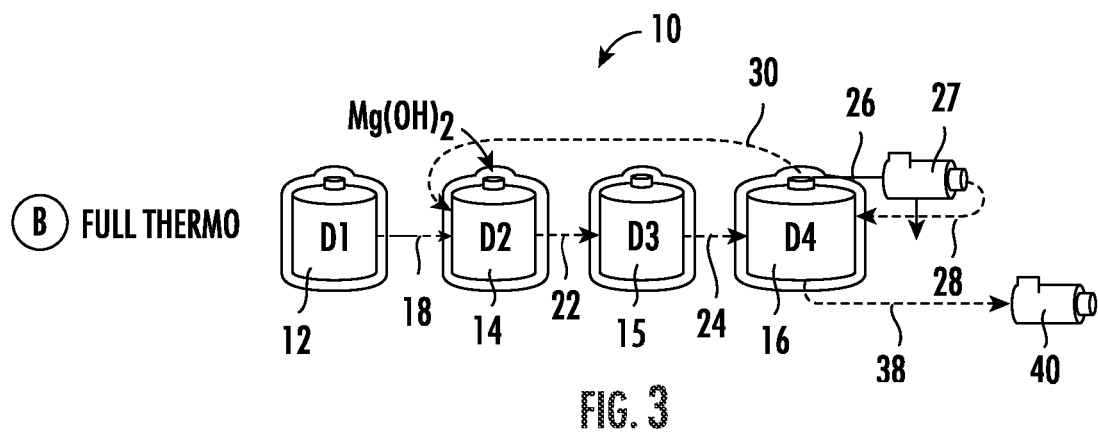
FIG. 3 is a schematic view of a third embodiment of a process for treating solid and liquid wastes in wastewater using an anaerobic digestion system and method.
Figure 4:
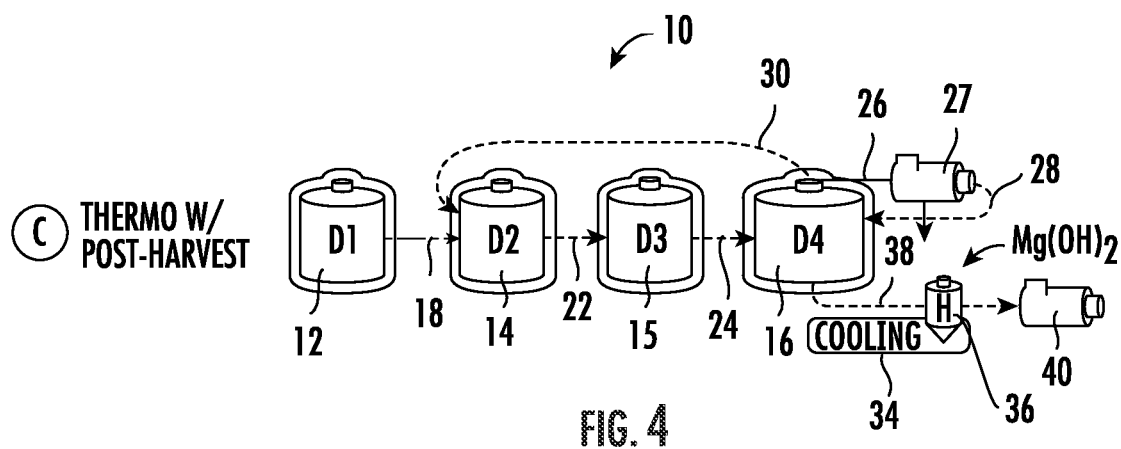
FIG. 4 is a schematic view of a fourth embodiment of a process for treating solid and liquid wastes in wastewater using an anaerobic digestion system and method.

In another embodiment of the process 10 shown in FIGS. 2-4, thermophilic operational temperature levels for anaerobic digesters can be used. Mesophilic temperature levels take place optimally around 37-41° C. or at ambient temperatures between 20-45° C. With these temperatures, mesophiles are the primary microorganism present. Thermophilic temperature levels take place optimally around 50-52° C. and at elevated temperatures up to 70° C. With these temperatures, thermophiles are the primary microorganisms present. Thermophilic operations have demonstrated higher metabolic rates, pathogen reduction and solids mineralization relative to mesophilic systems.

While the description of the process hereinabove is mesophilic, thermophilic operations provide additional benefit if market conditions exist for its application. FIGS. 2-4 show three potentially advantageous embodiments with digester process units 12, 14, 15, 16 identified as thermophilic by a box surrounding the respective digester tank. In the first embodiment, shown in FIG. 2, the acid gas digester 12 in the hydrolyzing first phase is run at thermophilic temperatures to increase solids-to-VFA conversion. The recycle feed ($Q_R$) 30 is cooled 32 to about 20° C. to avoid the struvite load formed in the harvesting digesters 14, 15 through the methane digester 16 and allow the first harvesting digester 14 (D2) to operate at mesophilic temperatures. Operation at lower temperatures may accelerate struvite production in the harvesting digesters 14, 15.

The second embodiment of the process 10, shown in FIG. 3, maintains thermophilic temperatures through the dewatering step to limit, instead of promoting, struvite formation anywhere in the system. While the harvesting digesters 14, 15 would still produce most of the struvite, total and by-phase production should decrease. Thermo digesting solids have lower viscosity at similar solids concentration for improved mixing at higher-than-normal digester concentrations; but higher temperatures are also known to increase ammonia toxicity due to increased dissociation toward antimicrobial free ammonia ($NH_3$) at higher temperatures. These conditions are suitable for pathogen reductions that align with (and with specific additional features could even achieve) USEPA standards for Class A biosolids.

The third embodiment of the process 10, shown in FIG. 4, is identical to the process shown in FIG. 3, but with addition of sludge cooling 34 and struvite collection 36, preferably using a MagPrex™ (Centrisys/CNP of Kenosha, WI) or similar system, downstream of digestion. The thermo digester operation should limit struvite fouling in upstream systems while cooling and downstream struvite production would provide nutrient recovery and protect dewatering and dewatering recycle piping from struvite.

While the invention has been shown and described in some detail with reference to specific exemplary embodiments, there is no intention that the invention be limited to such detail. On the contrary, the invention is intended to include any alternative or equivalent embodiments that fall within the spirit and scope of the invention as described and claimed herein.

We claim:

1. A method for treating a wastewater comprising phosphates and other nutrients and organic solids, the wastewater treatment method comprising the steps of:

feeding the wastewater into an acid gas digester where digestible carbohydrates in the wastewater undergo acidogenesis and acetogenesis forming volatile fatty acids and a suspended solids content to produce an acid gas digester effluent;

feeding the acid gas digester effluent into a plurality of harvesting anaerobic digesters downstream from the acid gas digester, each of the plurality of harvesting digesters connected in series;

injecting compressed biogas into the plurality of harvesting digesters to degas dissolved $CO_2$ and raise the pH;

feeding effluent from each of the plurality of harvesting digesters to a subsequent one of the plurality of harvesting digesters in the connected series of harvesting digesters, wherein a portion of solubilized phosphates are precipitated from the wastewater in a first harvesting digester of the plurality of harvesting digesters to produce a first harvesting digester effluent from the first harvesting digester having a reduced solubilized phosphate content; and feeding effluent from a last harvesting digester of the plurality of harvesting digesters into an anaerobic methane digester downstream of the last harvesting digester, wherein organic solids in the effluent from the last harvesting digester are converted into methane and a digested anaerobic sludge.

2. The wastewater treatment method as recited in claim 1, wherein the wastewater includes one or more of sewage sludge, fecal sludge, agricultural waste, animal processing waste, municipal solid organic waste, food waste, fats, oils, greases, and industrial waste.

3. The wastewater treatment method as recited in claim 1, further comprising the step of feeding the first harvesting digester with a recycle stream comprising a portion of effluent from the anaerobic methane digester having a concentration of a methanogenic bacteria.

4. The wastewater treatment method as recited in claim 1, wherein the anaerobic methane digester comprises a plurality of anaerobic methane digesters in parallel.

5. The wastewater treatment method as recited in claim 1, further comprising the step of adding a base to the first harvesting digester to adjust pH and precipitate soluble nitrogen species and phosphorus species (ortho-phosphate) in the form of struvite or brushite.

6. The wastewater treatment method as recited in claim 5, wherein the base is selected from magnesium hydroxide, magnesium chloride, calcium hydroxide, calcium oxides, calcium chlorides or combinations thereof.

7. The method according to claim 4, wherein a pH in each of the plurality of anaerobic methane digesters is maintained at about 7.0.

8. The wastewater treatment method as recited in claim 1, further comprising the steps of recuperative thickening of an effluent from one of the plurality of harvesting digesters or the anaerobic methane digester, and returning thickened solids to the same digester or to the next digester in the series operation.

9. The wastewater treatment method as recited in claim 1, further comprising the step of maintaining a temperature in the acid gas digester at about 50° C. to about 70° C.

10. The wastewater treatment method as recited in claim 1, further comprising the step of maintaining a temperature in the acid gas digester, the plurality of harvesting digesters, and the anaerobic methane digester of about 50° C. to about 70° C.

11. The wastewater treatment method as recited in claim 1, further comprising the step of maintaining an SRT in the acid gas digester of about 1 day to about 1.5 days.

12. The wastewater treatment method as recited in claim 1, further comprising the step of maintaining an SRT in the plurality of harvesting digesters of about 0.5 days to about 1.2 days.

13. The wastewater treatment method as recited in claim 1, further comprising the step of maintaining an SRT in the anaerobic methane digester of about 15 days.

14. A method for treating a wastewater comprising phosphates and other nutrients and organic solids, the wastewater treatment method comprising the steps of:
feeding the wastewater into an acid gas digester where digestible carbohydrates in the wastewater undergo acidogenesis and acetogenesis forming volatile fatty acids and a suspended solids content to produce an acid gas digester effluent;
feeding the acid gas digester effluent into a harvesting anaerobic digester downstream from the acid gas digester, wherein a portion of solubilized phosphates are precipitated from the wastewater in the harvesting digester to produce a harvesting digester effluent having a reduced solubilized phosphate content;
injecting compressed biogas into the harvesting digester to degas dissolved CO2 and raise the pH; and
feeding the harvesting digester effluent into an anaerobic methane digester downstream of the harvesting digester, wherein organic solids in the harvesting digester effluent are converted into methane and a digested anaerobic sludge.

15. The wastewater treatment method as recited in claim 14, wherein the harvesting anaerobic digester comprises a plurality of harvesting anaerobic digesters, each of the plurality of harvesting digesters connected in series.

16. The wastewater treatment method as recited in claim 14, wherein the anaerobic methane digester comprises a plurality of anaerobic methane digesters in parallel.

17. The wastewater treatment method as recited in claim 14, further comprising the step of feeding the harvesting digester with a recycle stream comprising a portion of effluent from the anaerobic methane digester having a concentration of a methanogenic bacteria.

18. The wastewater treatment method as recited in claim 14, further comprising the step of adding a base to the harvesting digester to adjust pH and precipitate soluble nitrogen species and phosphorus species (ortho-phosphate) in the form of struvite or brushite.

19. The wastewater treatment method as recited in claim 14, further comprising the step of maintaining a temperature in the acid gas digester at about 50° C. to about 70° C.

20. The wastewater treatment method as recited in claim 14, further comprising the step of maintaining a temperature in the acid gas digester, the harvesting digester, and the anaerobic methane digester of about 50° C. to about 70° C.

* * * * *